(12) United States Patent
Wang (10) Patent No.: US 11,350,632 B2
(45) Date of Patent: *Jun. 7, 2022

(54) METHODS, COMPOSITIONS AND SYSTEMS FOR KILLING ARTHROPODS

(71) Applicant: Imerys USA, Inc., Roswell, GA (US)

(72) Inventor: Bo Wang, Union City, CA (US)

(73) Assignee: Imerys USA, Inc., Roswell, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/937,875

(22) Filed: Jul. 24, 2020

(65) Prior Publication Data

US 2020/0352173 A1 Nov. 12, 2020

Related U.S. Application Data

(63) Continuation of application No. 16/077,094, filed as application No. PCT/US2017/017376 on Feb. 10, 2017, now Pat. No. 10,721,935.

(60) Provisional application No. 62/420,370, filed on Nov. 10, 2016, provisional application No. 62/355,316, filed on Jun. 27, 2016, provisional application No. 62/294,400, filed on Feb. 12, 2016.

(51) Int. Cl.
| | | |
|---|---|---|
| *A01N 59/06* | (2006.01) | |
| *A01N 25/08* | (2006.01) | |
| *A01N 25/12* | (2006.01) | |
| *A01N 25/24* | (2006.01) | |

(52) U.S. Cl.
CPC ............ *A01N 59/06* (2013.01); *A01N 25/08* (2013.01); *A01N 25/12* (2013.01); *A01N 25/24* (2013.01)

(58) Field of Classification Search
CPC ............ A01N 59/06; A01N 25/12; A01P 7/04
See application file for complete search history.

(56) References Cited

U.S. PATENT DOCUMENTS

| | | | | |
|---|---|---|---|---|
| 3,159,536 A | * | 12/1964 | Marotta ............... | A01N 59/00 424/600 |
| 3,917,814 A | * | 11/1975 | Hedges ............... | A01N 59/00 424/406 |
| 4,279,895 A | * | 7/1981 | Carle ................... | A01N 59/00 424/724 |
| 4,496,585 A | * | 1/1985 | Yoshida ............... | A01N 25/08 514/514 |
| 5,576,007 A | | 11/1996 | Ikeda et al. | |
| 5,662,065 A | | 9/1997 | Bandimere et al. | |
| 6,576,007 B2 | | 6/2003 | Dehdashtian et al. | |

| | | | | |
|---|---|---|---|---|
| 2002/0076734 A1 | | 6/2002 | Araya | |
| 2011/0094967 A1 | * | 4/2011 | Glienke ............... | A01G 24/35 210/660 |
| 2014/0242136 A1 | | 8/2014 | Phillips | |
| 2016/0001277 A1 | * | 1/2016 | Usui ..................... | B01J 29/763 502/64 |

FOREIGN PATENT DOCUMENTS

| | | |
|---|---|---|
| CN | 103342469 A | 10/2013 |
| CS | 240518 B1 | 7/1985 |
| DE | 41 31 117 A1 | 3/1998 |
| EP | 2 444 460 A1 | 4/2012 |
| JP | H06 80513 A | 3/1994 |
| WO | WO 98/38867 | 9/1998 |
| WO | WO 02/100418 A1 | 12/2002 |

OTHER PUBLICATIONS

Angelopoulos, P.M. et al., "Production of durable expanded perlite microspheres in a Vertical Electrical Furnace," Materials Science and Engineering, 123 (2016) 012061, pp. 1-6.
BASF (https://www.toshin-kasei.co.jp/basl%bast%20kaolin.pdf) accessed Oct. 4, 2019, pp. 1-8 (2019).
European Search Report for EP 17 75 0834, dated Jul. 4, 2019.
International Search Report and Written Opinion dated Apr. 17, 2017, in International Application No. PCT/US2017/017376 (19 pages).
Translation of CN 103342469 A, pp. 1-5 (2019).
Xanthos, "Functional fillers for plastics," Wiley-VCH, pp. 1-432 (2005).
*Pesticide Production Technology*, Wang Shijuan, p. 52, Chemical Industry Press (2008).
Extended European Search Report for Application No. 21187450.8—1110, dated Oct. 25, 2021, 4 pages.

* cited by examiner

*Primary Examiner* — Andrew S Rosenthal
(74) *Attorney, Agent, or Firm* — Finnegan, Henderson, Farabow, Garrett & Dunner, LLP (57) ABSTRACT

A method for killing arthropods may include providing a mineral composition to a substrate that arthropods will contact, wherein the mineral composition is not a carrier for chemical toxin. The mineral composition may include an aluminosilicate particulate, wherein contact between the mineral composition and an arthropod results in death of the arthropod. A composition for killing arthropods may include a mineral composition for associating with a substrate. The mineral composition may include at least one of an aluminosilicate particulate and a diatomaceous earth particulate, wherein the mineral composition is not a carrier for a chemical toxin. The mineral composition may have a median particle size $d_{50}$ of 10 μm or less. A system for killing arthropods may include a mineral composition including at least one of an aluminosilicate particulate and a diatomaceous earth particulate. The system may further include a substrate, wherein the mineral composition is associated with the substrate.

10 Claims, 4 Drawing Sheets

METHODS, COMPOSITIONS AND SYSTEMS FOR KILLING ARTHROPODS

CROSS-REFERENCE TO RELATED APPLICATIONS

This application is a continuation application of U.S. application Ser. No. 16/077,094, filed Aug. 10, 2018, which is a national stage entry of PCT/US2017/017376, filed Feb. 10, 2017, which claims the benefit of priority from U.S. Provisional Application No. 62/294,400, filed on Feb. 12, 2016; U.S. Provisional Application No. 62/355,316, filed on Jun. 27, 2016; and U.S. Provisional Application No. 62/420,370, filed on Nov. 10, 2016, the content of each of which is incorporated by reference herein in its entirety.

FIELD OF DISCLOSURE

The present disclosure relates to methods, compositions, and systems for killing arthropods, and more particularly, to methods, compositions, and systems including aluminosilicate particulate and/or diatomaceous earth particulate for killing arthropods.

BACKGROUND

Chemical insecticides and similar chemical toxins have been used to repel or kill undesirable arthropods, such as, for example, arachnids and insects. For example, they may be used to protect agricultural commodities, such as plants, crops, seeds, grain, and products derived from plants, from infestation. In addition, some insects such as mosquitos are known to transmit harmful and sometimes fatal diseases, such as malaria. However, many chemical toxins suffer from a number of undesirable characteristics. For example, many such toxins include chemical compositions that are harmful to the environment and humans as well as to the undesirable arthropods. In addition, undesirable arthropods may develop a resistance to some chemical toxins over time, and thus, the chemical toxins become less effective.

As a result, it is desirable to develop alternative methods, compositions, and systems to kill undesirable arthropods while mitigating or eliminating undesirable effects to the environment and humans, and maintain the long term effectiveness without resistance developed by arthropods. The methods, compositions, and systems disclosed herein may kill undesirable arthropods and mitigate or eliminate one or more of the undesirable effects.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

According to a first aspect, a method for killing arthropods may include providing a mineral composition to a substrate that arthropods will contact, wherein the mineral composition is not a carrier tor a chemical toxin. The mineral composition may include an aluminosilicate particulate, wherein contact between the mineral composition and an arthropod results in death of the arthropod.

According to yet another aspect, a composition for killing arthropods may include a mineral composition for associating with a substrate. The mineral composition may include at least one of an aluminosilicate particulate and a diatomaceous earth particulate, wherein the mineral composition is not a carrier for a chemical toxin. The mineral composition may have a median particle size $d_{50}$ of 10 μm or less.

According to yet another embodiment, the mineral composition may have a low crystalline silica content (e.g., quartz, cristobalite, etc.), such as for example less than about 2% crystalline silica.

According to a further aspect, a system for killing arthropods may include a mineral composition including at least one of an aluminosilicate particulate and a diatomaceous earth particulate. The system may further include a substrate, wherein the mineral composition is associated with the substrate. According to one aspect, the substrate may include an adhesive tape, such as a single-sided or double-sided adhesive tape.

According to another aspect a method for killing arthropods may include applying an aluminosilicate particulate to an area or item using an aerosol delivery system.

According to another aspect, a method for protecting an agricultural commodity from an arthropod may include applying an amount of a mineral composition to the agricultural commodity, wherein the mineral composition is not a carrier for a chemical toxin. The mineral composition may include an aluminosilicate particulate, wherein contact between the mineral composition and an arthropod results in death of the arthropod.

Aside from the arrangements set forth above, the embodiments could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this description, illustrate several exemplary embodiments and together with the description, serve to explain the principles of the embodiments. In the drawings.

DETAILED DESCRIPTION

Reference will now be made in more detail to a number of exemplary embodiments of the methods, compositions, and systems.

According to some embodiments, a method for killing arthropods may include providing a mineral composition to a substrate that arthropods will contact, wherein the mineral composition is not a carrier for a chemical insecticide or toxin. The mineral composition may include an aluminosilicate particulate, wherein contact between the mineral composition and an arthropod results in death of the arthropod. The mineral compositions herein may serve as an insecticide that kill arthropods while avoiding insecticide resistance, e.g., thus avoiding chemical resistance typical of chemical insecticides.

The arthropod may include, for example, at least one of Insecta and Arachnids. For example, the Insecta may include one of Coleoptera, Diptera, Lepidopterea, Hemiptera, and Thysanoptera. For example, the Insecta may include one of a beetle, a potato beetle, a flea beetle, a larvae of a fly, a larvae of whitefly, a larvae of mosquito, a mosquito (e.g., *Anopheles gambiae*), a caterpillar of moths, a caterpillar of earworm, a corn earworm, a caterpillar of army worm, a caterpillar of looper, a caterpillar of leafminer, a lygus bug, an aphid, a psyllid, a scale insect, a mealybug, a head louse, and a thrip. According to some embodiments, the Arachnida may include Acari. For example, live Acari may include one of a spider mite, a rust mite, and a gall mite. Other arthropods are contemplated for use in the systems, devices, and methods herein.

Without to wishing to be bound by theory, it is believed that the hard sharp edges of the mineral composition may be effective in killing arthropods, including but not limited to, for example, mosquitos. It is thought that tire sharp edges can scratch the waxy or oily outer layer of the insects (such as soft-bodied insects), which then results in death by dehydration. Mineral particulates having a smaller (including, e.g., ultrafine) particle size distribution may have relatively sharper edges than mineral particulates having a relatively larger particle size distribution. Smaller particles may also be more easily transferred and attached to the body of insects to scratch their outer layer with hard sharp edges. Thus, mineral particulates having a relatively smaller particle size distribution may be more effective at killing arthropods via a mechanical insecticide effect, for example, without the use or presence of chemical insecticides or toxins.

According to some embodiments, the aluminosilicate particulate may include natural glass or a material derived from a natural glass. For example, the aluminosilicate particulate may be selected from the group consisting of perlite, pumice, volcanic ash, calcined kaolin, smectite, mica, shirasu, obsidian, pitchstone, rice hull ash, and combinations thereof. For example, the aluminosilicate particulate may include expanded perlite, such as, for example, milled expanded perlite.

The term "natural glass," as used herein, refers to natural glasses, which may also be referred to as "volcanic glasses," that are formed by the rapid cooling of siliceous magma or lava. Several types of natural glasses are known, including but not limited to, for example, perlite, pumice, pumicite, obsidian, and pitchstone. Volcanic glasses, such as perlite and pumice, occur in massive deposits and find wide commercial use. Volcanic ash, often referred to as "tuff" when in consolidated form, includes small particles or fragments that may be in glassy form. As used herein, the term "natural glass" encompasses volcanic ash.

Natural glasses may be chemically equivalent to rhyolite. Natural glasses that are chemically equivalent to trachyte, dacite, andesite, latite, and basalt are also known, but may be less common. The term "obsidian" is generally applied to large numbers of natural glasses that are rich in silica. Obsidian glasses may be classified into subcategories according to their silica content, with rhyolitic obsidians (containing typically about 73% $SiO_2$ by weight) being the most common.

Perlite is a hydrated natural glass that may contain, for example, about 72% to about 75% $SiO_2$ by weight, about 12% to about 14% $Al_2O_3$ by weight, about 0.5% to about 2% $Fe_2O_3$ by weight, about 3% to about 5% $Na_2O$ by weight, about 4 to about 5% $K_2O$ by weight, about 0.4% to about 1.5% CaO by weight, and small amounts of other metallic elements. Perlite may be distinguished from other natural glasses by a relatively higher content (such as about 2% to about 5% by weight) of chemically-bonded water, the presence of a vitreous, pearly luster, and characteristic concentric or arcuate onion skin-like (i.e., perlitic) fractures. Perlite products may be prepared by milling and thermal expansion, and may possess unique physical properties such as high porosity, low bulk density, and chemical inertness. "Perlite," as used herein, also includes expanded perlite. Perlite typically has a Mohs hardness greater than about 5, such as ranging from about 5.5 to about 7.0.

Pumice is a natural glass characterized by a mesoporous structure (e.g., having pores or vesicles, sometimes having pore sizes up to about 1 millimeter). The porous nature of pumice gives it a very low apparent density, in many cases allowing it to float on the surface of water. Most commercial pumice contains from about 60% to about 70% $SiO_2$ by weight. Pumice may be processed by milling and classification, and products may be used as lightweight aggregates and also as abrasives, adsorbents, and fillers.

Rice hulls contain sufficient silica that they can be commercially ashed for their siliceous residue, a product commonly known as "rice hull ash." Certain sponges are also concentrated sources of silica, the remnants of which may be found in geologic deposits as acicular spicules.

Particle sizes and other particle size properties referred to in the present disclosure may be measured by any appropriate measurement, technique now known to the skilled artisan or hereafter discovered, such as, for example, a Sedigraph 5100 instrument, as supplied by Micromeritics Corporation, or a Microtrac Model X-100, as supplied by Leeds & Norththrup. Using such measuring devices, the size of a given particle is expressed in terms of the diameter of a sphere of equivalent diameter, sometimes referred to as "an equivalent spherical diameter" or "ESD." The median particle size, or the "$d_{50}$" value, or $d_{50}$ diameter, is the value determined by the particle ESD at which 50% by weight of the particles have an ESD less than the $d_{50}$ value. Similarly, the top size "$d_{90}$" value, or $d_{90}$ diameter, is the value determined by the particle ESD at which 90% by weight of the particles have an ESD less than the top size $d_{90}$ value, and the "$d_{10}$" value, or $d_{10}$ diameter, is the value determined by the particle ESD at which 10% by weight of the particles have an ESD less than the $d_{10}$ value. Other methods and/or devices for determining particle size and related properties are contemplated.

According to some embodiments of the method, the aluminosilicate particulate may have a median particle size $d_{50}$ of 15 μm or less, 12 μm or less, or 10 μm or less. For example, the aluminosilicate particulate may have a median particle size $d_{50}$ of 7.5 μm or less, a median particle size $d_{50}$ of 5 μm or less, or a median particle size $d_{50}$ of 2.5 μm or less. According to some embodiments, the aluminosilicate particulate may have a top particle size $d_{90}$ of 45 μm or less. For example, the aluminosilicate particulate may have a top particle size $d_{90}$ of 35 μm or less, a top particle size $d_{90}$ of 25 μm or less, a top particle size $d_{90}$ of 15 μm or less, a top particle size $d_{90}$ of 20 μm or less, or a top particle size $d_{90}$ of 10 μm or less. According to some embodiments, the aluminosilicate particulate may have a particle size $d_{10}$ of 2.5 μm or less. For example, the aluminosilicate particulate may have a particle size $d_{10}$ of 1.5 μm or less, or a particle size $d_{10}$ of 1.0 μm or less.

According to some embodiments of the method, the aluminosilicate particulate may have a median particle size $d_{50}$ of 10 μm or less, a top particle size $d_{90}$ of 45 μm or less, and a particle size $d_{10}$ of 2.5 μm or less. According to some embodiments, the aluminosilicate particulate may have a median particle size $d_{50}$ of 5 μm less, a top particle size $d_{90}$ of 35 μm or less, and a particle size $d_{10}$ of 1.5 μm or less. According to some embodiments, the aluminosilicate particulate may have a median particle size $d_{50}$ of 3 μm or less, a top particle size $d_{90}$ of 11 μm or less, and a particle size $d_{10}$ of 1.2 μm or less.

According to some aspects of the present disclosure, the aluminosilicate particulate may have a $d_{50}$ particle size ranging from 0.5 μm to 12 μm, such as from 1 μm to 10 μm, from 2 μm to 8 μm, from 3 μm to 5 μm, from 4 μm to 6 μm, from 1 μm to 2 μm, from 0.5 μm to 2 μm, or from 0.5 μm to 1 μm. Further for example, the aluminosilicate particulate may have a $d_{10}$ particle size ranging from 0.2 μm to 5 μm, such as from 0.5 μm to 3 μm, from 0.7 μm to 1.5 μm, or from 1 μm to 1.5 μm and/or the aluminosilicate particulate may have a $d_{90}$ particle size ranging from 10 μm to 40 μm, such as from 25 μm to 35 μm, from 30 μm to 35 μm, from 20 μm to 25 μm, or from 30 μm to 40 μm. The aluminosilicate particulates may comprise, for example, perlite or diatomaceous earth.

According to one embodiment, the crystalline silica content of aluminosilicate described herein is less than about 5% by weight relative to the total weight of the calcined diatomite. In one embodiment, the crystalline silica content is less than about 3% by weight. In another embodiment, the crystalline silica content is less than about 2% by weight. In a further embodiment, the crystalline silica content is less than about 1% by weight. In yet another embodiment, the crystalline silica content is less than about 0.5% by weight. In yet a further embodiment, the crystalline silica content is less than about 0.2% by weight. In still another embodiment, the crystalline silica content is less than about 0.1% by weight.

Crystalline silica content may be measured, for example, by the quantitative X-ray diffraction method outlined in H. P. Klug and L. E. Alexander, X-Ray Diffraction Procedures for Polycrystalline and Amorphous Materials 531-563 (2nd ed. 1972). According to that method, a sample is milled in a mortar and pestle to a fine powder, then back-loaded into a sample holder. The sample and its holder are placed into the beam path of an X-ray diffraction system and exposed to collimated X-rays using an accelerating voltage of 40 kV and a current of 20 mA focused on a copper target. Diffraction data are acquired by step-scanning over the angular region representing the interplanar spacing within the crystalline lattice structure of crystalline silica, yielding the greatest diffracted intensity. That region ranges from 21 to 23 2θ (2-theta), with data collected in 0.05 2θ steps, counted for 20 seconds per step. The net integrated peak intensity is compared with those of standards of crystalline silica prepared by the standard additions method in amorphous silica to determine the weight percent of the crystalline silica phase in a sample.

According to some embodiments of the method, the aluminosilicate particulate may have a platy morphology. As used herein, "platy morphology" refers to particulates having an aspect ratio greater than 1. In contrast, particulates having an aspect ratio less than or equal to 1 would be considered to have a "blocky morphology."

The morphology of the aluminosilicate particulate, according to some embodiments, may be characterized by aspect ratio. The aspect ratio of a particulate refers generally to a ratio of the length-to-width of the particulate. For a given particulate sample, the aspect ratio may be determined as an average. For example, the aspect ratio of the aluminosilicate particulate according to some embodiments may be determined by first depositing a slurry including a sample of the aluminosilicate particulate on a standard SEM stage and coating the slurry with platinum. Images of the slurry may thereafter be obtained, and the particle dimensions may be determined, for example, using a computer-based analysis, in which it is assumed that the thickness and width of the particles are equal. The aspect ratio may then be determined by averaging a number of calculations (e.g., fifty calculations) of individual particle length-to-width aspect ratios. Other methods of determining aspect ratios are contemplated.

According to some embodiments, the aluminosilicate particulate may have an aspect ratio of at least 3:1. For example, the aluminosilicate particulate may have an aspect ratio of at least 12:1, an aspect ratio of at least 15:1, an aspect ratio of at least 18:1, an aspect ratio of at least 24:1, an aspect ratio of at least 34:1, or an aspect ratio of at least 55:1.

According to some embodiments of the method, the aluminosilicate particulate may have a median plate thickness of less than or equal to about 2 μm, such as, for example, less than or equal to about 1 μm. According to some embodiments, the aluminosilicate particulate may have a median plate thickness ranging from about 0.05 μm to about 2 μm.

According to some embodiments of the method, the aluminosilicate particulate may have at least four sharp corners. In some embodiments, the sharp corners may have an angle of less than about 150 degrees, such as, for example, less than about 120 degrees or ranging from about 90 to about 150 degrees.

According to some embodiments, the mineral composition may further include diatomaceous earth particulate. Diatomaceous earth particulate may be obtained from naturally occurring or "natural" diatomaceous earth (also called "DE" or "diatomite"), which is generally known as a sediment-enriched in biogenic silica (i.e., silica produced or brought about by living organisms) in the form of siliceous skeletons (frustules) of diatoms. Diatoms are a diverse array of microscopic, single-celled, golden-brown algae generally of the class Bacillariophyceae that possess an ornate siliceous skeleton of varied and intricate structures including two valves that, in the living diatom, fit together much like a pill box.

Diatomaceous earth may form from the remains of water-borne diatoms, and therefore, diatomaceous earth deposits may be found close to either current or former bodies of water. Those deposits are generally divided into two categories based on source: freshwater and saltwater. Freshwater diatomaceous earth is generally mined from dry lakebeds and may be characterized as having a low crystalline silica content and a high iron content. In contrast, saltwater diatomaceous earth is generally extracted from oceanic areas and may be characterized as having a high crystalline silica content and a low iron content.

According to some embodiments of the present disclosure, the diatomaceous earth particulate may have a median particle size $d_{50}$ of 15 μm or less. For example, the diatomaceous earth particulate may have a median particle size $d_{50}$ of 12 μm or less, a median particle size $d_{50}$ of 7.5 μm or less, or a median particle size $d_{50}$ of 5 μm or less, or a median particle size $d_{50}$ of 2 μm or less, or a median particle size $d_{50}$ of 1 μm or less. According to some embodiments, the diatomaceous earth particulate may have a top particle size $d_{90}$ of 45 µm or less. For example, the diatomaceous earth particulate may have a top particle size $d_{90}$ of 35 µm or less, a top particle size $d_{90}$ of 25 µm or less, or a top particle size $d_{90}$ of 10 µm or less. According to some embodiments, the diatomaceous earth particulate may have a particle size $d_{10}$ of 5 µm or less. For example, the diatomaceous earth particulate may have a particle size $d_{10}$ of 2.5 µm or less, or a particle size $d_{10}$ of 1.5 µm or less, or a particle size $d_{10}$ of 1.0 µm or less.

According to some aspects of the present disclosure, the diatomaceous earth particulate may have a $d_{50}$ particle size ranging from 0.5 µm to 12 µm, such as from 1 µm to 10 µm, from 2 µm to 8 µm, from 3 µm to 5 µm, from 4 µm to 6 µm, from 1 µm to 2 µm, from 0.5 µm to 2 µm, or from 0.5 µm to 1 µm. Further for example, the diatomaceous earth particulate may have a $d_{10}$ particle size ranging from 0.2 µm to 5 µm, such as from 0.5 µm to 3 µm, from 0.7 µm to 1.5 µm, or from 1 µm to 1.5 µm and/or the diatomaceous earth particulate may have a $d_{90}$ particle size ranging from 10 µm to 40 µm, such as from 25 µm to 35 µm, from 30 µm to 35 µm, from 20 µm to 25 µm, or from 30 µm to 40 µm.

According to some embodiments of the method, the diatomaceous earth particulate may have a median particle size $d_{50}$ of 12.5 µm or less, a top particle size $d_{90}$ of 35 µm or less, and a particle size $d_{10}$ of 5 µm or less. According to some embodiments, the diatomaceous earth particulate may have a median particle size $d_{50}$ of 5 µm or less, a top particle size $d_{90}$ of 10 µm or less, and a particle size $d_{10}$ of 2.5 µm or less.

According to some embodiments of the method, the substrate may include at least one of an agricultural commodity, a building surface (e.g., a wall surface or ground surface), a single or double sided tape, and a netting. For example, the agricultural commodity may include at least one of a crop, a plant, a seed, a grain, and a product derived from a plant. According to some embodiments, the substrate may include netting (e.g., mosquito netting) and tape, and the arthropod may include a mosquito (e.g., *Anopheles gambiae*).

According to some other embodiments, a method for killing arthropods may include applying an aluminosilicate particulate to an area or item using an aerosol delivery system. For example, an aerosol spray apparatus similar to that disclosed in U.S. Pat. No. 9,398,771B1 to Phillips for use with diatomite could be adapted for use with an aluminosilicate particulate.

According to some other embodiments, a method for killing arthropods may include applying an aluminosilicate particulate to an area or item as a wettable powder in a dilute suspension through liquid spraying equipment.

According to some embodiments, a composition for killing arthropods may include a mineral composition for associating with a substrate. The mineral composition may include at least one of an aluminosilicate particulate and a diatomaceous earth particulate, wherein the mineral composition is not a carrier for a chemical insecticide or toxins. The mineral composition may have a median particle size $d_{50}$ of 10 µm or less.

According to some embodiments of the composition, the aluminosilicate particulate may include natural glass. For example, the aluminosilicate particulate may be selected from the group consisting of perlite, pumice, volcanic ash, calcined kaolin, smectite, mica, shirasu, obsidian, pitchstone, rice hull ash, and combinations thereof. For example, the aluminosilicate particulate may include expanded perlite, such as, for example, milled expanded perlite.

According to some embodiments of the composition, the aluminosilicate particulate may have a median particle size $d_{50}$ of 10 µm or less. For example, the aluminosilicate particulate may have a median particle size $d_{50}$ of 7.5 µm or less, a median particle size $d_{50}$ of 5 µm or less, or a median particle size $d_{50}$ of 2.5 µm or less. According to some embodiments, the aluminosilicate particulate may hove a top particle size $d_{90}$ of 45 µm or less. For example, the aluminosilicate particulate may have a top particle size $d_{90}$ of 35 µm or less, a top particle size $d_{90}$ of 25 µm or less, or a top particle size $d_{90}$ of 10 µm or less. According to some embodiments, the aluminosilicate particulate may have a particle size $d_{10}$ of 2.5 µm or less. For example, the aluminosilicate particulate may have a particle size $d_{10}$ of 1.5 µm or less, or a particle size $d_{10}$ of 1.0 µm or less.

According to some embodiments of the composition, the aluminosilicate particulate may have a median particle size $d_{50}$ of 10 µm or less, a top particle size $d_{90}$ of 45 µm or less, and a particle size $d_{10}$ of 2.5 µm or less. According to some embodiments, the aluminosilicate particulate may have a median particle size $d_{50}$ of 5 µm or less, a top particle size $d_{90}$ of 35 µm or less, and a particle size $d_{10}$ of 1.5 µm or less. According to some embodiments, the aluminosilicate particulate may have a median particle size $d_{50}$ of 3 µm or less, a top particle size $d_{90}$ of 11 µm or less, and a particle size $d_{10}$ of 1.2 µm or less.

According to some embodiments of the composition, the aluminosilicate particulate may have a platy morphology. For example, the aluminosilicate particulate may have an aspect ratio of at least 3:1. For example, the aluminosilicate particulate may have an aspect ratio of at least 12:1, an aspect ratio of at least 15:1, an aspect ratio of at least 18:1, an aspect ratio of at least 24:1, an aspect ratio of at least 34:1, or an aspect ratio of at least 55:1.

According to some embodiments of the composition, the aluminosilicate particulate may have a median plate thickness of less than or equal to about 2 µm, such as, for example, less than or equal to about 1 µm. According to some embodiments, the aluminosilicate particulate may have a median plate thickness ranging from about 0.05 µm to about 2 µm.

According to some embodiments of the composition, the aluminosilicate particulate may have at least four sharp corners. In some embodiments, the sharp corners may have an angle of less than about 150 degrees, such as, for example, less than about 120 degrees or ranging from about 90 to about 150 degrees.

According to some embodiments, the aluminosilicate may be modified by silanization to render the surfaces more hydrophobic using the methods appropriate for silicate minerals (see e.g., U.S. Pat. Nos. 3,915,735 and 4,260,498). For example, the aluminosilicate can be placed in a vessel, and a small quantity of dimethyldichlorosilane (i.e., $SiCl_2(CH_3)_2$) or hexadimethylsilazane (i.e., $(CH_3)_3Si—NH—Si(CH_3)_3$) added to the vessel. Reaction can be allowed to take place at the surface in the vapor phase over a 24 hr period, resulting in more hydrophobic products. Other hydrophobic coatings such as polydimethylsiloxane (PDMS) can also be used.

According to some other embodiments, the surface charge of the aluminosilicate can also be modified to a more positively charged form using various coating agents such as amine containing molecules, multivalent metal cation, or amino acids.

According to some embodiments of the composition, the diatomaceous earth particulate may have a median particle size $d_{50}$ of 15 µm or less. For example, the diatomaceous earth particulate may have a median particle size $d_{50}$ of 12 μm or less, a median particle size $d_{50}$ of 7.5 μm or less, or a median particle size $d_{50}$ of 5 μm or less. According to some embodiments, the diatomaceous earth particulate may have a top particle size $d_{90}$ of 45 μm or less. For example, the diatomaceous earth particulate may have a top particle size $d_{90}$ of 35 μm or less, a top particle size $d_{90}$ of 25 μm or less, or a top particle size $d_{90}$ of 10 μm or less. According to some embodiments, the diatomaceous earth particulate may have a particle size $d_{10}$ of 5 μm or less. For example, the diatomaceous earth particulate may have a particle size $d_{10}$ of 2.5 μm or less, or a particle size $d_{10}$ of 1.5 μm or less.

According to some embodiments of the composition, the diatomaceous earth particulate may have a median particle size $d_{50}$ of 12.5 μm or less, a top particle size $d_{90}$ of 35 μm or less, and a particle size $d_{10}$ of 5 μm or less. According to some embodiments, the diatomaceous earth particulate may have a median particle size $d_{50}$ of 5 μm or less, a top particle size $d_{90}$ of 10 μm or less, and a particle size $d_{10}$ of 2.5 μm or less.

According to some embodiments, the diatomaceous earth may be modified by silanization to render the surfaces more hydrophobic using the methods appropriate for silicate minerals (see e.g., Moreland, 1975; Sample, 1981). For example, the diatomaceous earth can be placed in a vessel, and a small quantity of dimethyldichlorosilane (i.e., $SiCl_2(CH_3)_2$) or hexadimethylsilazane (i.e., $(CH_3)_3Si$—NH—$Si(CH_3)_3$) added to the vessel. Reaction can be allowed to take place at the surface in the vapor phase over a 24 hr period, resulting in more hydrophobic products. Other hydrophobic coatings such as polydimethylsiloxane (PDMS) can also be used.

According to some other embodiments, the surface charge of the diatomaceous earth can also be modified to a more positively charged form using various coating agents such as amine containing molecules, multivalent metal cation, or amino acids.

According to some embodiments, a system for killing arthropods may include a mineral composition including at least one of an aluminosilicate particulate and a diatomaceous earth particulate according those described herein. The system may further include a substrate, wherein the mineral composition is associated with the substrate.

According to some embodiments of the system, the substrate may include netting, and the system may further include a binder associated with the netting, wherein the binder adheres the mineral composition to the netting. For example, the binder may include a polymer, such as, for example, acrylic polymer or other similar polymers. Other binders are contemplated.

According to some embodiments of the system, the substrate may include an adhesive tape, such as a single-sided or double-sided adhesive tape. Exemplary tapes that could be used as a substrate for the mineral composition/insecticide include for example commercial double sided tapes with different tackiness such as 3M 666 (low density polyethylene (LDPE) liner with repositionable medium tack adhesive 1070 on a clear UPVC film carrier), 3M 9415PC (high tack 3M™ 400 acrylic adhesive on one side and low tack 3M™ 1000 series repositionable acrylic adhesive ('post it') on the other side of a polyester film carrier) and 3M 9425 (high tack acrylic adhesive 420 on one side and medium tack acrylic adhesive 1050 on the other side polycoated kraft paper liner with a UPVC carrier).

According to one embodiment, a protective liner can be removed from one side of a double sided tape. The exposed tacky surface of tape side not covered with liner can then be treated to attach the mechanical insecticide powder by pressing the tacky surface of the tape onto a layer of mineral composition/insecticide powder evenly to make powder stick on the tape surface. Alternatively, the mechanical insecticide powder can be attached to the tape surface by blowing the mechanical insecticide powder onto the tape surface using compressed air.

Similar procedures can also be used to apply the mineral composition to the tape surface originally covered with liner, by peeling off the liner prior to attaching the mechanical insecticide powder. After the mechanical insecticide powder has been attached to the tape surface, the liner can be re-affixed onto the tape surface to protect the mechanical insecticide powder. Double sided tapes with mechanical insecticide can be placed on selected indoor furniture and surfaces, behind free standing cupboards and cabinets, under beds and other furniture, behind headboards, etc. The double sided tape with mechanical insecticide can also be placed around window frames or selected patches of painted surfaces. Additionally, the double sided tape with mechanical insecticide can also be applied to exterior surfaces that are protected from rain exposure, e.g. patios, awnings, etc.

Loading level of the mechanical insecticide on the tape can be calculated by measuring the weight increase of the tape after powder attachment and the tape area. For example, loading level for the micronized perlite mechanical insecticide on the 3M 666 double sided tape can be in the range of 5 $g/m^2$ to 100 $g/m^2$, such as from about 10 $g/m^2$ to about 80 $g/m^2$, or from about 20 $g/m^2$ to about 70 $g/m^2$, or from about 35 $g/m^2$ to about 55 $g/m^2$, or about 43 $g/m^2$.

According to some embodiments, a method for killing arthropods may include applying an aluminosilicate particulate to an area or item using an aerosol delivery system. For example, the aerosol delivery system can include a spray can suitable for spraying powder, such as that described in U.S. Pat. Nos. 9,389,771; 6,394,321; or 6,581,807. In general, such an apparatus may include a metal can or other suitable rigid container for holding pressurized gas. The aerosol delivery system may also include a propellant, such as for example a mixture of isobutane and propane (e.g. propellant A-46) or a liquefied petroleum gas (e.g. propellant blend A70).

In one embodiment, an unmatured anhydrous alcohol can be intermixed with the aluminosilicate particulate. The alcohol may include a conventional proppellant alcohol such as SD-40 or SDAG-6 that is capable of evaporating rapidly one sprayed, thereby leaving dried aluminosilicate particulate on a sprayed surface.

In some embodiments, the aluminosilicate particulate may be present in an amount of at least 3% by weight of the contents of the aerosol delivery system, such as for example at least 5% by weight of the contents, at least 7% by weight of the contents, or at least 10% by weight of the contents. In other embodiments, the aluminosilicate particulate may be present as an aqueous slurry in an amount of at least 15% by weight, such as for example at least 25% by weight, or at least 35% by weight, and the slurry can be present in an amount of at least 10% or more of the contents of the delivery system. In such embodiments the propellant may be present in an amount of more than about 35% by weight of the contents of the aerosol delivery system and/or the alcohol may be more than about 55% by weight of the contents of the aerosol delivery system.

One skilled in the art will appreciate that the contents of the aerosol delivery system need not be exactly in the aforementioned proportions, that the spray apparatus may function similarly with more or less of those components, and that "about" in this context means refers to variations of the aforementioned proportions that allow the spray apparatus to function with similar results.

According to some embodiments of the system, the substrate may include an agricultural commodity that may include at least one of crops, plants, seeds, grain, and products derived from a plant. According to some embodiments, the mineral composition may be applied to the crops and plants, for example, such that it is adhered to the crops and plants. According to some embodiments, the mineral composition may be mixed with at least one of seeds, grain, and a product derived from a plant.

According to some embodiments, a method for protecting an agricultural commodity from an arthropod may include applying an amount of a mineral composition to the agricultural commodity, wherein the mineral composition is not a carrier for a chemical insecticide or toxin. The mineral composition may include an aluminosilicate particulate, wherein contact between the mineral composition and an arthropod results in death of the arthropod.

According to some embodiments of the method for protecting, the method may be effective in protecting a plant including at least one of a corn plant, a citrus tree, a chickpea plant, a broccoli plant, a lettuce plant, a cabbage plant, and a strawberry plant. According to some embodiments of the method, the plant may include one of a cereal, an oilseed, a fruit tree, a berry plant, a vegetable, a pasture plant, a forage plant, and a fungi.

According to some embodiments of the method for protecting, the agricultural commodity may include plants, and the method may further include forming a slurry including the mineral composition, and applying the mineral composition includes spraying the slurry onto the plants.

For example, according to some embodiments of the method for protecting, the slurry may include water. According to some embodiments, the slurry may further include at least one of soap and a composition including at least one of pyrethins and azadirachtin mixed in water. For example, the soap may be composition including fatty acids, such as, for example, potassium fatty acids, dissolved in water, such as, for example, soft water. For example, the fatty acids may be long-chain fatty acids having from 10 to 18 carbon atoms. Embodiments of slurry including at least one of pyrethins and azadirachtin mixed in water may be present in a product marketed under the tradename AZERA®. It is contemplated that the slurry composition may include other compositions.

According to some embodiments of the method for protecting, the slurry may include from 0.1 lbs. to 1.5 lbs. of the mineral composition per gallon of slurry. For example, the slurry may include from 0.2 lbs. to 1.3 lbs. of the mineral composition per gallon of slurry. For example, the slurry may include from 0.3 lbs. to 1.2 lbs. of mineral composition per gallon of slurry, for example, from 0.5 lbs. to 1.0 lbs. of mineral composition per gallon of slurry.

According to some embodiments, the slurry may include the mineral composition, water, and one or more additional additives. For example, the slurry may include one or more of dispersants, wetting agents, antifoaming agents, thickeners, antifreeze, and anti-microbial agents.

According to some embodiments of the method for protecting, the agricultural commodity may include at least one of seeds, grain, and a product derived from a plant, and applying the mineral composition may include mixing the mineral composition with the at least one of seeds, grain, and a product derived from a plant.

According to some embodiments of the method for protecting, the aluminosilicate particulate may include natural glass. For example, the aluminosilicate particulate may be selected from the group consisting of perlite, pumice, volcanic ash, calcined kaolin, smectite, mica, shirasu, obsidian, pitchstone, rice hull ash, and combinations thereof. For example, the aluminosilicate particulate may include expanded perlite, such as, for example, milled expanded perlite.

According to some embodiments of the method for protecting, the aluminosilicate particulate may have a median particle size $d_{50}$ of 10 μm or less. For example, the aluminosilicate particulate may have a median particle size $d_{50}$ of 7.5 μm or less, a median particle size $d_{50}$ of 5 μm or less, or a median particle size $d_{50}$ of 2.5 μm or less. According to some embodiments, the aluminosilicate particulate may have a top particle size $d_{90}$ of 45 μm or less. For example, the aluminosilicate particulate may have a top particle size $d_{90}$ of 35 μm or less, a top particle size $d_{90}$ of 25 μm or less, or a top particle size $d_{90}$ of 10 μm or less. According to some embodiments, the aluminosilicate particulate may have a particle size $d_{10}$ of 2.5 μm or less. For example, the aluminosilicate particulate may have a particle size $d_{10}$ of 1.5 μm or less, or a particle size $d_{10}$ of 1.0 μm or less.

According to some embodiments of the method for protecting, the aluminosilicate particulate may have a median particle size $d_{50}$ of 10 μm or less, a top particle size $d_{90}$ of 45 μm or less, and a particle size $d_{10}$ of 2.5 μm or less. According to some embodiments, the aluminosilicate particulate may have a median particle size $d_{50}$ of 5 μm or less, a top particle size $d_{90}$ of 35 μm or less, and a particle size $d_{10}$ of 1.5 μm or less. According to some embodiments, the aluminosilicate particulate may have a median particle size $d_{50}$ of 3 μm or less, a top particle size $d_{90}$ of 11 μm or less, and a particle size $d_{10}$ of 1.2 μm or less.

According to some embodiments of the method for protecting, the aluminosilicate particulate may have a platy morphology. For example, the aluminosilicate particulate may have an aspect ratio of at least 3:1. For example, the aluminosilicate particulate may have an aspect ratio of at least 12:1, an aspect ratio of at least 15:1, an aspect ratio of at least 18:1, an aspect ratio of at least 24:1, an aspect ratio of at least 34:1, or an aspect ratio of at least 55:1.

According to some embodiments of the method for protecting, the diatomaceous earth particulate may have a median particle size $d_{50}$ of 15 μm or less. For example, the diatomaceous earth particulate may have a median particle size $d_{50}$ of 12 μm or less, a median particle size $d_{50}$ of 7.5 μm or less, or a median particle size $d_{50}$ of 5 μm or less, or a median particle size $d_{50}$ of 2 μm or less, e.g., a $d_{50}$ diameter ranging from 0.5 μm to 2 μm, or from 0.5 μm to 1 μm. According to some embodiments, the diatomaceous earth particulate may have a top particle size $d_{90}$ of 45 μm or less. For example, the diatomaceous earth particulate may have a top particle size $d_{90}$ of 35 μm or less, a top particle size $d_{90}$ of 25 μm or less, or a top particle size $d_{90}$ of 10 μm or less. According to some embodiments, the diatomaceous earth particulate may have a particle size $d_{10}$ of 5 μm or less. For example, the diatomaceous earth particulate may have a particle size $d_{10}$ of 2.5 μm or less, or a particle size $d_{10}$ of 1.5 μm or less.

According to some embodiments of the method for protecting, the diatomaceous earth particulate may have a median particle size $d_{50}$ of 12.5 μm or less, a top particle size $d_{90}$ of 35 μm or less, and a particle size $d_{10}$ of 5 μm or less. According to some embodiments, the diatomaceous earth particulate may have a median particle size $d_{50}$ of 5 μm or less, a top particle size $d_{90}$ of 10 μm or less, and a particle size $d_{10}$ of 2.5 μm or less.

According to some embodiments, ultra-fine perlite mechanical insecticide can be used in vector control in home and agriculture to protect human, livestock and poultry, etc.

The following examples are intended to illustrate aspects of the present disclosure without, however, being limiting in nature. It is understood that the present disclosure encompasses additional embodiments consistent with the foregoing description and following examples.

EXAMPLES

Example 1

Ultrafine Perlite Sample

An ultrafine perlite sample was prepared using a pilot scale ceramic lined 50-SDG Attritor stirred media mill by Union Process. A commercially available expanded perlite product was used as the feed material. This feed material had a particle size distribution of a $d_{10}$ of 21 μm and a top size $d_{90}$ of 112 μm. The feed material was milled at batch mode with thirty minutes milling time. The milled perlite product was then collected as the ultrafine perlite sample.

The particle size distribution of the ultrafine perlite sample was determined using a Microtrac Model X-100 instrument from Leeds & Northrup. The ultrafine perlite sample was determined to have a particle size distribution of a $d_{10}$ of 1.01 μm, a median particle size $d_{50}$ of 4.22 μm, and a top size $d_{90}$ of 32.59 μm. This milled ultrafine perlite could be air classified to with even finer particle size. For example, the classified ultrafine perlite had a particle size distribution of a $d_{10}$ of 1.12 μm, a median particle size $d_{50}$ of 2.80 μm, and a top size of 10.49 μm. Physical properties of the ultrafine perlite mechanical insecticide are listed in Table 1.

TABLE 1

| Physical properties of the ultrafine perlite mechanical insecticide | |
|---|---|
| Loose weight bulk density (lb/cf) | 27 |
| Wet density (lb/cf) | 62 |
| 325 mesh retaining (%) | 1 |
| Water absorption (%) | 33 |
| Oil absorption (%) | 39 |
| Moisture (%) | 0.2 |
| Crystalline silica (%) | Below detection limit (0.1%) |

To apply the ultrafine perlite mechanical insecticide, high slurry concentration is preferred to produce high mechanical insecticide loading/coverage on the applied surface. High concentration of particles with high bulk/wet density and low water/oil absorption can be loaded into the slurry without increasing the slurry viscosity over the limit for spraying.

Mosquito Killing Test with Milled Expanded Perlite

Bioassays were conducted with milled expanded ultrafine perlite using a simple cone bioassay approach to determine "LT" values (i.e., the amount of exposure time to kill a certain percentage of a population of mosquitos). Twenty-five adult female mosquitos (i.e., *Anopheles gambiae*) (Kisumu, susceptible strain) were used per assay, with each bioassay repeated three times. Standard environmental conditions were set to a temperature of 27° C. and 35% relative humidity. The cone bioassays include mosquito nets, with the netting coated with a hinder of acrylic polymer, with milled expanded ultrafine perlite samples adhered to the acrylic polymer binder.

Figure 1:
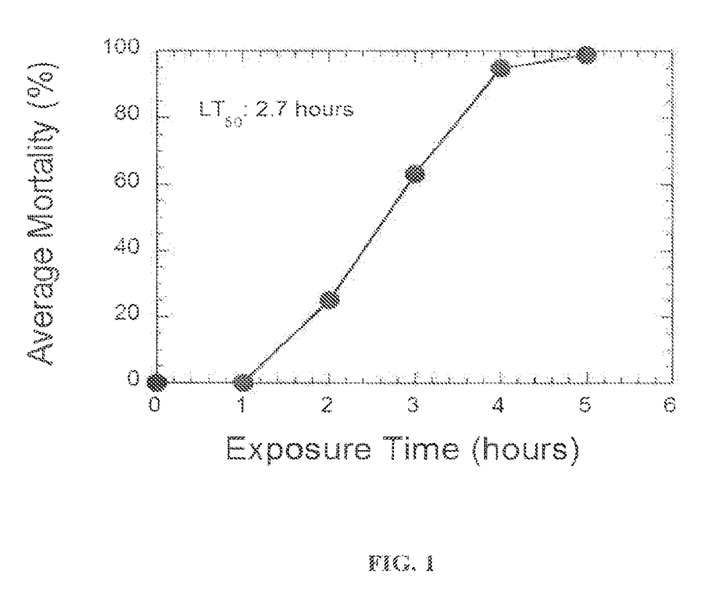
FIG. 1 is a graph showing average mortality of a mosquito population vs. exposure time for an exemplary milled expanded ultrafine perlite sample.

Table 2 shows the percentage of mortality of the mosquito test population vs. exposure time. As shown in Table 1, after two hours exposure, about 25% of mosquitos were killed. About 63% of the mosquitos were killed after three hours exposure, and after five hours of exposure, 99% of the mosquitos were killed. FIG. 1 shows the average mortality of the three repeats vs. exposure time. Based on these results, the time to kill 50% of the mosquitos ($LT_{50}$) was calculated to be about 2.7 hours.

TABLE 2

| Percentage Mortality vs. Exposure Time | | | | | |
|---|---|---|---|---|---|
| Hour(s) | Rep 1 | Rep 2 | Rep 3 | Average | Standard Deviation |
| 0 | 0 | 0 | 0 | 0 | 0 |
| 1 | 0 | 0 | 0 | 0 | 0 |
| 2 | 32 | 32 | 12 | 25 | 9.4 |
| 3 | 72 | 60 | 56 | 63 | 6.8 |
| 4 | 96 | 96 | 92 | 95 | 1.9 |
| 5 | 100 | 96 | 100 | 99 | 1.9 |

The results of this testing show that the milled, expanded ultrafine perlite sample was effective for killing mosquitos. Further, the testing shows that the milled, expanded ultrafine perlite sample was effective for killing mosquitos without the use of a chemical insecticide or toxins.

It was previously believed that desiccation by absorbing wax (lipids) molecules from the epicuticle of insects was the mode of action for natural powder insecticide. Particles with lower oil and water absorption was expected to have lower efficacy. However, the ultrafine perlite mechanical insecticide has very lower water and oil absorption but surprisingly was found to have very high efficacy so the killing mechanism for the ultra-fine perlite mechanical insecticide may be different from simple desiccation.

Figure 2:
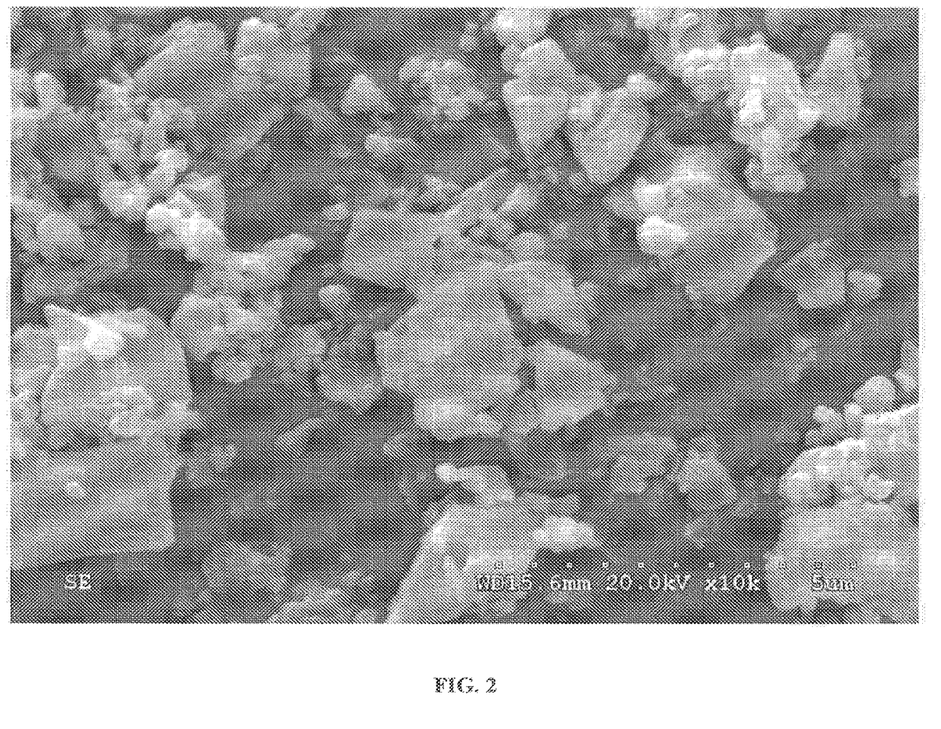
FIG. 2 is a scanning electron microscope (SEM) image of an exemplary milled expanded ultrafine perlite sample.
Figure 3A:
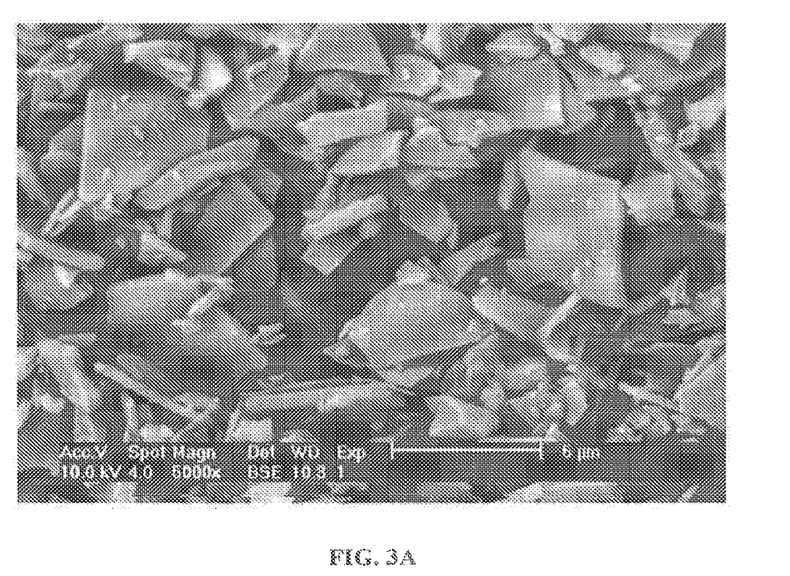
FIGS. 3A and 3B are SEM images of the exemplary milled expanded ultrafine perlite sample taken at a higher magnification than FIG. 2.
Figure 3B:
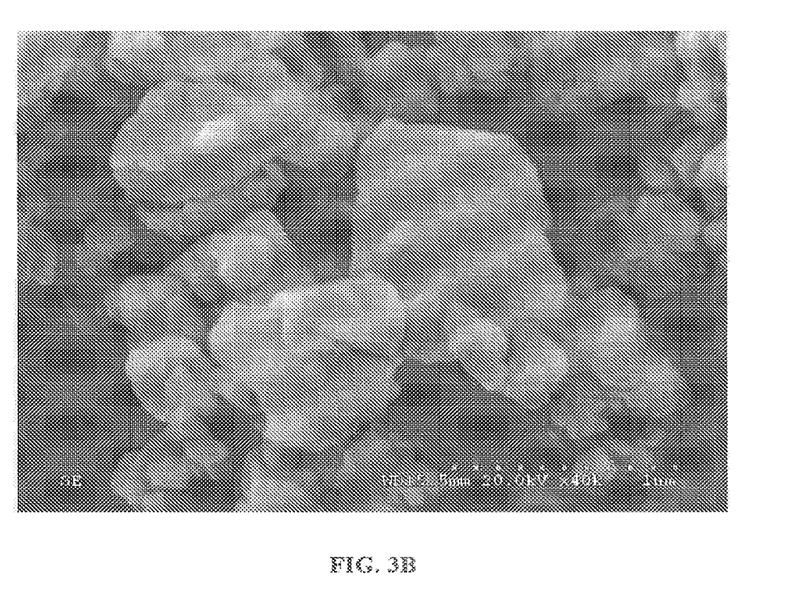
Figure 4:
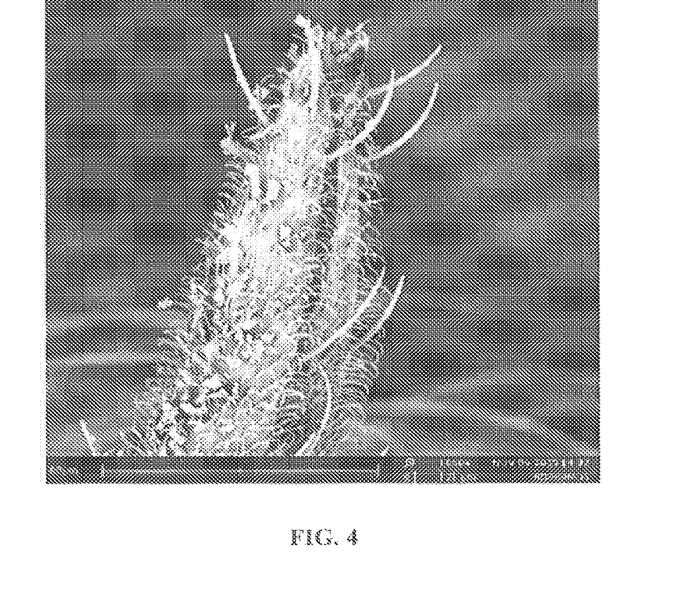
FIG. 4 is an SEM image of a portion of a dead mosquito from the testing.
Figure 5:
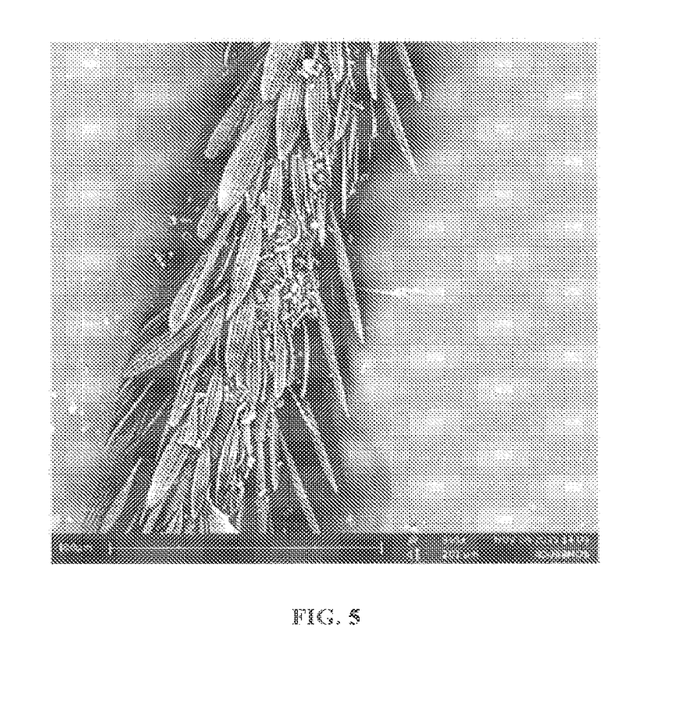
FIG. 5 is an SEM image of another portion of a dead mosquito from the testing.

Without wishing to be bound by theory, it is believed that the milled, expanded ultrafine perlite sample may be effective in killing mosquitos because the milled expanded ultrafine perlite particles have hard sharp edges that may damage the surface of the mosquitos (i.e., the exoskeleton). For example, FIGS. 2, 3A, and 3B show scanning electron microscope (SEM) images of the milled, expanded ultrafine perlite sample. As can be seen, particularly in FIG. 3A, the milled, expanded ultrafine perlite sample has a platy morphology including relatively sharp corners, which may damage the exoskeleton of mosquitos (or other arthropods) by scratching the waxy or oily outer layer of soft-bodied insects, which die eventually from dehydration. FIG. 3B shows a higher resolution SEM image of the milled, expanded ultrafine perlite sample. FIGS. 4 and 5 are SEM images of portions of dead mosquitos from the testing, and particles of the milled, expanded ultrafine perlite sample can be seen on the mosquito.

Example 2

Mosquito Killing Test with Diatomaceous Earth

Similar to the testing described above, bioassays were conducted using a simple cone bioassay approach to determine time to the LT values (i.e., the amount of exposure time to kill a certain percentage of the mosquitos). One hundred-fifty adult female mosquitos (i.e., *Anopheles gambiae*) were used per assay. Standard environmental conditions were set to a temperature of 24° C. and 37% relative humidity. The cone bioassays include mosquito nets, with the netting coated with a binder of acrylic polymer, with diatomaceous earth samples contacted with the acrylic polymer binder.

Diatomaceous Earth Particulate Samples

To test the effects of particle size on mosquito mortality, three diatomaceous earth particulate samples were prepared, each having a different particle size distribution. Table 3 below shows the particle size distributions of the three samples A-C. Each of the samples was prepared from a commercially available diatomaceous earth particulate.

TABLE 3

Diatomaceous Earth Sample Particle Size Distribution

| Sample | $d_{10}$ (μm) | $d_{50}$ (μm) | $d_{90}$ (μm) |
|---|---|---|---|
| A - Standard | 4 | 12 | 32 |
| B - Coarse | 12 | 26 | 50 |
| C - Fine | 2 | 5 | 10 |

Table 4 below shows the time to 50% mortality ($LT_{50}$) (hours) and the time to 80% mortality ($LT_{80}$) (hours) for the three diatomaceous earth samples A-C. As can be seen in Table 4, sample C corresponding to the finer particle size distribution killed mosquitos more quickly ($LT_{50}$=1.43 hours; $LT_{80}$=2.67 hours) with the next finest sample A (standard) killing mosquitos more quickly ($LT_{50}$=2.5 hours; $LT_{80}$=3.04 hours) than the relatively coarse sample B (coarse) ($LT_{50}$=5.79 hours; $LT_{80}$=9.76 hours). This suggests that a diatomaceous earth particulate having a finer particle size distribution may be more efficient and/or more effective in killing mosquitos than a diatomaceous earth particulate having a relatively larger particle size distribution.

TABLE 4

Time to Mortality for the Diatomaceous Earth Samples A-C

| Sample | $LT_{50}$ (hours) | $LT_{80}$ (hours) |
|---|---|---|
| A - Standard | 2.5 | 3.04 |
| B - Coarse | 5.79 | 9.76 |
| C - Fine | 1.43 | 2.67 |

Example 3

Exemplary Application by Aerosol Spraying onto Bed Netting

A Spra-Tool spraying can (available from Acrovoc Industries, inc.) was loaded with an expanded, milled ultrafine perlite-based mechanical insecticide slurry comprising the expanded, milled perlite of Example 1. It was found that effective spraying was possible at slurry concentrations as high as 40%. Spray application was made by single pass spraying onto a 15 cm×15 cm Texsport polypropylene bed net, and was found to result in about 5 g/m² to 7 g/m² dried mechanical insecticide loading (see Table 4 below).

TABLE 5

Slurry Concentration vs Net Loading

| Slurry Concentration (%) | Empty Net Mass (g) | Sprayed Net Mass (g) | Loading (g/m²) |
|---|---|---|---|
| 30 | 0.56 | 0.74 | 8 |
| 30 | 0.61 | 0.73 | 2.333 |
| 30 | 0.59 | 0.74 | 6.667 |
|  |  | Average | 6.667 |

TABLE 5-continued

Slurry Concentration vs Net Loading

| Slurry Concentration (%) | Empty Net Mass (g) | Sprayed Net Mass (g) | Loading (g/m²) |
|---|---|---|---|
| 40 | 0.51 | 0.62 | 4.889 |
| 40 | 0.65 | 0.78 | 5.778 |
| 40 | 0.64 | 0.74 | 4.444 |
|  |  | Average | 5.037 |

Higher slurry concentration is believed to be preferred since it should allow higher loading of solid mechanical insecticide. As shown in Table 6 below, the maximum slurry concentration for spraying was found to be only 15% by weight for a commercial expanded perlite filler having a $d_{50}$ of 17 μm and a water absorption of 250%, due to the high viscosity of the slurry (see Table 5 below). In contrast, the expanded, milled ultrafine perlite mechanical insecticide was found to be sprayable at concentrations as high as 40% by weight. It is hypothesized that the higher water absorption of commercial expanded perlite resulted in higher viscosity.

TABLE 6

Slurry Concentration vs Viscosity

| Sample | Slurry Concentration (%) | Viscosity (KU) |
|---|---|---|
| DI water | 0 | 0 |
| Expanded, Milled Ultrafine Perlite Mechanical Insecticide (present disclosure) | 40 | 0 |
| Expanded Perlite Control | 15 | 63 |

Example 4

Exemplary Application by Double Sided Tape 1-inch and 4-inch wide 3M 9425 Scotch double sided tapes were sprayed with ultrafine perlite mechanical insecticide according to Example 1. The insecticide loading was about 34 g/m² to 53 g/m².

TABLE 7

Double sided tapes sprayed with ultrafine perlite mechanical insecticide.

| Tape Width (mm) | Tape Length (mm) | Loading (g/m²) |
|---|---|---|
| 25.4 | 67.0 | 33.7 |
| 25.4 | 67.0 | 52.8 |
| 101.6 | 68.2 | 52.5 |

Example 5

Exemplary Field Trial Using Ultrafine Perlite Mechanical Insecticide

During a field trial in New Orleans, bioassays were performed with (1) the expanded, milled ultrafine perlite of Example 1, (2) a lambda-cyhalothrin insecticide (BASF) as positive control, and (3) a negative control (water only). Six samples of each insecticide (1) and (2) and the control (3) were tested against mosquito species *Aedes aegypti* (dengue and zika vector), *Aedes albopictus* (tiger mosquito), and *Culex quinquefasciatus* (nuisance mosquito) by spraying wood chips stored under houses using a STIHL SR 200 backpack sprayer (18 houses total). The houses were selected based on housing structure (raised house), backyard vegetation (green and lush), and location (suburban neighborhood).

The lambda cyhalothrin (industry standard insecticide) was prepared according to manufacturer instructions. Lambda cyhalothrin insecticide was diluted with water for spray application. First the application tank was filled with one-half to three-fourths volume of water. The pH of the water was controlled between 5 and 7 using a buffering agent if necessary to adjust the pH. Next, lambda cyhalothrin insecticide was slowly added to the applicator tank water with maximum agitation. Finally, the tank was filled to the desired volume with continuous agitation while applying the spray. To prepare the perlite insecticide spraying solutions, two-thirds of a gallon of water, 0.32 ounces of non-ionic surfactant (Ninex MT615), and 2 lbs expanded, milled ultrafine perlite were thoroughly blended together in a spray tank. Another one-third gallon of water was then added for a total 1 gallon of spray solution containing 20% of ultrafine perlite mechanical insecticide, 79% of water and 1% of Ninex MT615 as dispersant. The ultrafine perlite solution was mixed directly prior to spraying.

The ultrafine perlite insecticide, the positive control (lambda cyhalothrin) and the negative control (water) were sprayed directly under the raised houses and porches (which included eaves if reachable) and under vegetation with an applicator. Pre-treated substrates were also prepared for each location by applying the corresponding insecticide or control to a piece of pine. The target coverage was 5-8 ounces per 100 ft$^2$, with an average coverage of about 10 g/m$^2$ to 15 g/m$^2$.

Adult mosquitos for each species were introduced to each location, and were identified and counted two weeks prior to the start of the bioassays. Weekly bioassays were performed to test the efficacy of the insecticides over time by collecting a pre-treated substrate from each site and placing ~10 female mosquitos of the corresponding species into a labeled bioassay cup with the substrate. The cup was then placed in a growth chamber/counter (depending on temperature) for 1 hour and then 24 hours with sugar solution. The number of dead and live mosquitos was recorded and compared to determine the percent mortality. Results are shown in Tables 8-10, in which 100% indicates complete mortality of mosquitoes and 0% indicates zero mortality (no mosquito deaths).

TABLE 8

Mortality (%) of *Andes aegypti*

| Week | (1) Ultrafine perlite | (2) Lambda cyhalothrin (positive control) | (3) Water (negative control) |
|---|---|---|---|
| 0 | 0 | 0 | 0 |
| 1 | 0 | 0 | 0 |
| 2 | 100 | 100 | 0 |
| 3 | 100 | 100 | 0 |
| 4 | 100 | 100 | 0 |
| 5 | 97 | 100 | 0 |
| 6 | 73 | 100 | 0 |
| 7 | 100 | 100 | 0 |
| 8 | 100 | 100 | 0 |

TABLE 9

Mortality (%) of *Andes albopictus*

| Week | (1) Ultrafine perlite | (2) Lambda cyhalothrin (positive control) | (3) Water (negative control) |
|---|---|---|---|
| 0 | 0 | 0 | 0 |
| 1 | 0 | 0 | 0 |
| 2 | 100 | 100 | 0 |
| 3 | 93 | 100 | 0 |
| 4 | 87 | 100 | 0 |
| 5 | 37 | 100 | 0 |
| 6 | 90 | 100 | 0 |
| 7 | 90 | 100 | 0 |
| 8 | 100 | 100 | 0 |

TABLE 10

Mortality (%) of *Culex quinquefasciatus*

| Week | (1) Ultrafine perlite | (2) Lambda cyhalothrin (positive control) | (3) Water (negative control) |
|---|---|---|---|
| 0 | 0 | 0 | 0 |
| 1 | 0 | 0 | 0 |
| 2 | 93 | 100 | 0 |
| 3 | 97 | 100 | 0 |
| 4 | 100 | 97 | 0 |
| 5 | 83 | 100 | 0 |
| 6 | 87 | 93 | 0 |
| 7 | 100 | 100 | 0 |
| 8 | 90 | 100 | 0 |

A 100% mortality was found for the ultrafine perlite and the lambda cyhalothrin using on each mosquito species. The relative decrease in mortality rates at week 5 coincided with heavy rainfall that caused the wood chips to get wet. Increased mortality rates in the following weeks indicate that efficacy was not lost, however. As shown by the above results, the ultrafine perlite was found to have similar mortality results as the lambda cyhalothrin. While the two were found to have similar efficacy, it is expected that insects will not develop a resistance to perlite over time as may occur with lambda cyhalothrin or other chemical insecticides.

Other embodiments will be apparent to those skilled in the art from consideration of the specification and practice of the embodiments disclosed herein. It is intended that the specification and examples be considered as exemplary only.

What is claimed is:

1. A composition comprising aluminosilicate particles having at least four sharp corners and useful as an insecticide; wherein the aluminosilicate particles comprise milled expanded perlite and have a D50 of 10 μm or less, a platy morphology, and an aspect ratio of at least 3:1.

2. The composition of claim 1, wherein the aluminosilicate particles have a D90 less than about 10 microns.

3. The composition of claim 1, wherein the sharp corners have an angle of less than 150 degrees.

4. The composition of claim 1, wherein the aluminosilicate particles comprise diatomaceous earth.

5. The composition of claim 1, wherein the aluminosilicate particles have a D10 in the range of from about 0.2 to about 5 microns.

6. A slurry comprising water and milled expanded perlite particles, wherein the slurry includes from 0.1 lbs. to 1.5 lbs.

of the milled expanded perlite per gallon of the slurry; wherein the milled expanded perlite particles have a D50 of 10 µm or less, a platy morphology, and an aspect ratio of at least 3:1.

7. The slurry of claim 6, wherein the milled expanded perlite particles have a D90 less than about 10 microns.

8. The slurry of claim 6, wherein the milled expanded perlite particles have a D10 in the range of from about 0.2 to about 5 microns.

9. The slurry of claim 6, wherein the milled expanded perlite particles have at least four sharp corners.

10. The slurry of claim 9, wherein the sharp corners have an angle of less than 150 degrees.

* * * * *